United States Patent
Ohlsson et al.

(10) Patent No.: US 11,206,539 B2
(45) Date of Patent: Dec. 21, 2021

(54) USER EQUIPMENT, NETWORK NODE AND METHODS IN A WIRELESS COMMUNICATIONS NETWORK

(71) Applicant: Telefonaktiebolaget LM Ericsson (publ), Stockholm (SE)

(72) Inventors: Oscar Ohlsson, Stockholm (SE); Icaro L. J. da Silva, Solna (SE); Gunnar Mildh, Sollentuna (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 280 days.

(21) Appl. No.: 16/346,661

(22) PCT Filed: Mar. 1, 2019

(86) PCT No.: PCT/SE2019/050176
§ 371 (c)(1),
(2) Date: May 1, 2019

(87) PCT Pub. No.: WO2020/060460
PCT Pub. Date: Mar. 26, 2020

(65) Prior Publication Data
US 2021/0014687 A1    Jan. 14, 2021

Related U.S. Application Data

(60) Provisional application No. 62/732,034, filed on Sep. 17, 2018.

(51) Int. Cl.
*H04L 29/06*     (2006.01)
*H04W 12/106*    (2021.01)
(Continued)

(52) U.S. Cl.
CPC ......... *H04W 12/106* (2021.01); *H04W 12/69* (2021.01); *H04W 76/19* (2018.02)

(58) Field of Classification Search
CPC ..... H04W 12/06; H04W 12/69; H04W 76/19; H04W 12/106; H04L 63/08; H04L 63/0869
See application file for complete search history.

(56) References Cited

U.S. PATENT DOCUMENTS 8,724,509 B2 *   5/2014   Cheng ................. H04W 12/08
                                                    370/254
9,497,673 B2 *  11/2016   Blankenship ...... H04W 12/084
(Continued)

FOREIGN PATENT DOCUMENTS

EP     2271144 B1    10/2012
WO    2017122588 A1   7/2017
(Continued)

OTHER PUBLICATIONS

3GPP, "3rd Generation Partnership Project; Technical Specification Group Core Network and Terminals; Numbering, addressing and identification (Release 15)", 3GPP TS 23.003 V15.4.0, Jun. 2018, 1-10.
(Continued)

*Primary Examiner* — Hosuk Song
(74) *Attorney, Agent, or Firm* — Murphy, Bilak & Homiller, PLLC

(57) ABSTRACT

Methods, User Equipment, UE, (120) and source network node (111) for re-establishing a Radio Resource Control, RRC, connection to a target cell in a wireless communications network (100), The UE generates a security token using a set of input parameters, and sends a re-establishment request with the security token to a target network node (112) serving the target cell. When receiving the re-establishment request, the source network node generates a
(Continued)

security token using a set of input parameters in the same manner as the UE. If the received security token is successfully verified when compared with the generated security token, the source network node provides to the target network node a UE context of the UE, to enable the target network node to re-establish the RRC connection.

10 Claims, 11 Drawing Sheets

(51) Int. Cl.
  *H04W 76/19* (2018.01)
  *H04W 12/69* (2021.01)

(56) References Cited

U.S. PATENT DOCUMENTS

| | | | |
|---|---|---|---|
| 9,730,204 B2* | 8/2017 | Yi | H04W 28/0268 |
| 9,998,964 B2* | 6/2018 | Blankenship | H04W 16/32 |
| 10,104,540 B2* | 10/2018 | Horn | H04W 8/06 |
| 10,251,208 B2* | 4/2019 | Tenny | H04W 76/19 |
| 10,701,702 B2* | 6/2020 | Shih | H04W 76/27 |
| 10,834,581 B2* | 11/2020 | Mildh | H04W 80/08 |
| 2011/0269426 A1 | 11/2011 | Hultin et al. | |
| 2014/0051447 A1 | 2/2014 | Li | |
| 2014/0220974 A1 | 8/2014 | Hsu | |
| 2016/0353361 A1 | 12/2016 | Jung et al. | |
| 2018/0220486 A1 | 8/2018 | Tseng et al. | |
| 2019/0082367 A1 | 3/2019 | Lin et al. | |
| 2019/0124509 A1 | 4/2019 | Nakarmi et al. | |
| 2020/0015074 A1 | 1/2020 | Kim et al. | |
| 2020/0053821 A1 | 2/2020 | Shih et al. | |
| 2020/0214070 A1 | 7/2020 | Ingale et al. | |
| 2020/0221281 A1 | 7/2020 | Rajadurai et al. | |
| 2020/0275512 A1 | 8/2020 | Wu et al. | |
| 2020/0344604 A1 | 10/2020 | He et al. | |
| 2021/0051472 A1 | 2/2021 | Shih et al. | |

FOREIGN PATENT DOCUMENTS

| | | |
|---|---|---|
| WO | 2018031345 A1 | 2/2018 |
| WO | 2019215680 A1 | 11/2019 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, 1-303.

3GPP, "3rd Generation Partnership Project; Technical Specification Group Radio Access Network; NR; User Equipment (UE) procedures in Idle mode and RRC Inactive state (Release 15)", 3GPP TS 38.304 V15.0.0, Jun. 2018, 1-25.

3GPP, "3rd Generation Partnership Project; Technical Specification Group Services and System Aspects; 3GPP System Architecture Evolution (SAE); Security architecture (Release 15)", 3GPP TS 33.401 V15.4.0, Jun. 2018, 1-162.

3GPP, "3rd Generation Partnership Project; Technical Specification Group Services and System Aspects; Security architecture and procedures for 5G system (Release 15)", 3GPP TS 33.501 V15.1.0, Jun. 2018, 1-152.

Unknown, Author, "Discussion on rogue gNB detection", 3GPP TSG SA WG3 (Security) Meeting #88, S3-171893, Dali, China, Aug. 7-11, 2017, 1-4.

Unknown, Author, "Introduction of SA", 3GPP TSG-WG2 Meeting #103, R2-1813492, Gothenburg, Sweden, Aug. 20-24, 2018, 1-483.

Unknown, Author, "Use the old KRRCint for calculation of the security token in MSG3", 3GPP TSG-SA WG3 Meeting #92, S3-182639, Dalian, China, Aug. 20-24, 2018, 1-4.

Kim, Taehun, et al., "Method to Support Security in RRC Inactive", Provisional U.S. Appl. No. 62/693,985, 2018, 1-14.

* cited by examiner

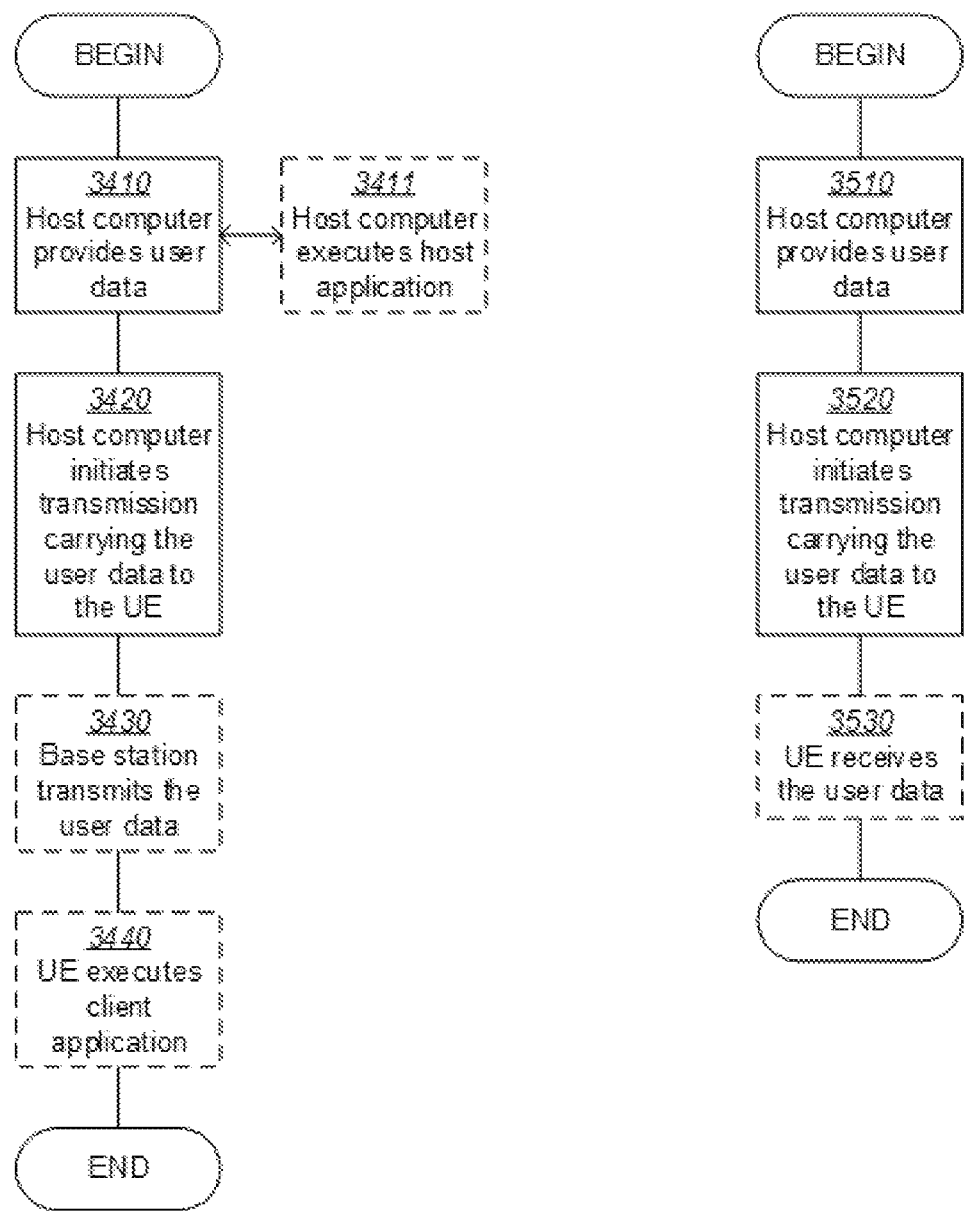

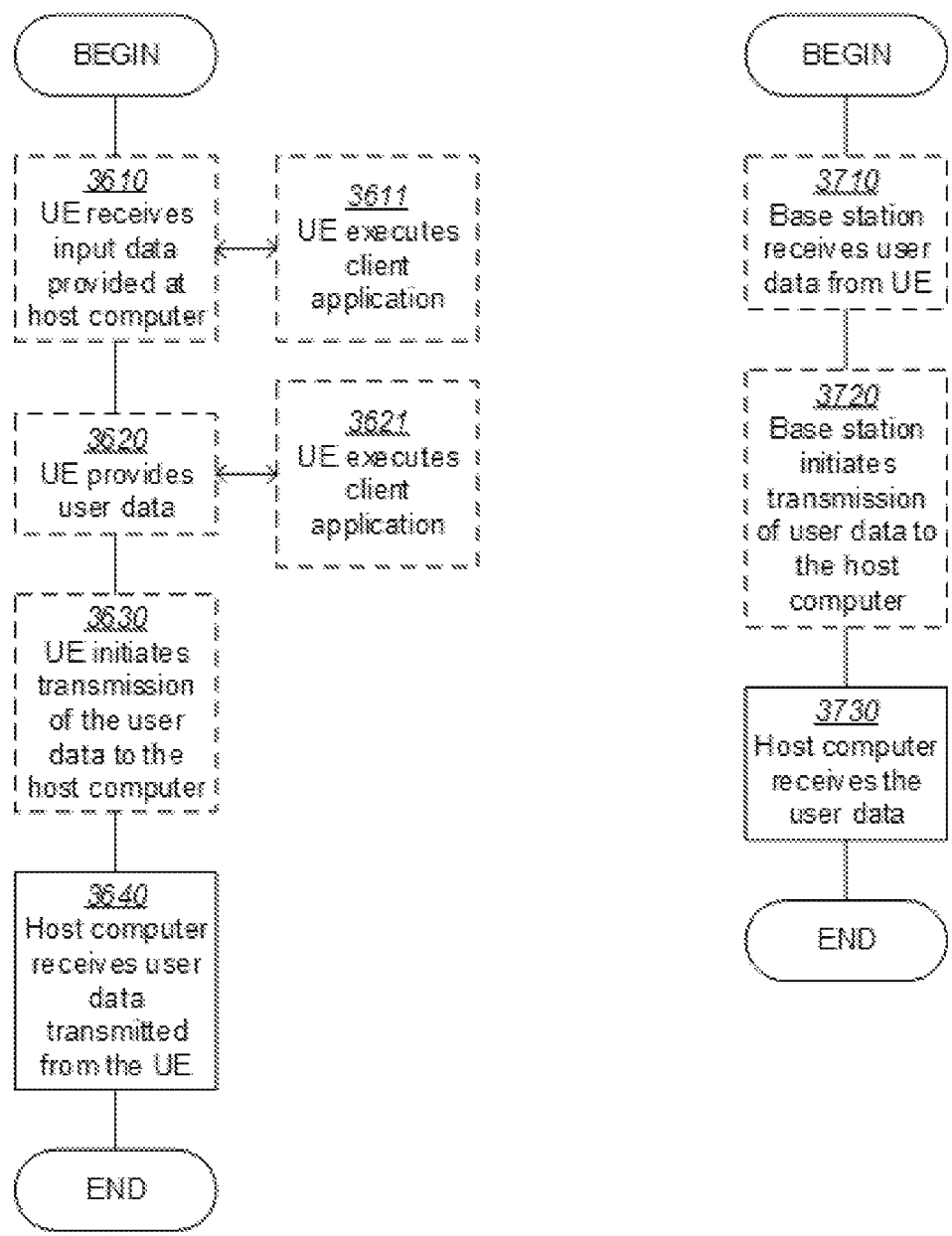

USER EQUIPMENT, NETWORK NODE AND METHODS IN A WIRELESS COMMUNICATIONS NETWORK

TECHNICAL FIELD

The present disclosure relates generally to a User Equipment, UE, a source network node and methods therein, for re-establishing a Radio Resource Control, RRC, connection of the UE to a target cell in a wireless communications network.

BACKGROUND

In a typical wireless communications network, wireless devices, also known as wireless communication devices, mobile stations, stations (STA) and/or User Equipments (UE), communicate via a Local Area Network such as a Wi-Fi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

The wireless communications network described in this disclosure may involve any of the above example networks and will frequently be referred to herein as "the network" for short.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Radio Resource Control, RRC, Connection Re-Establishment

In NR, if a UE's link to a network becomes poor, the UE triggers a Radio Link Failure (RLF) procedure. The link may be considered poor for example if the perceived downlink quality is lower than a threshold, if a random access-procedure is unsuccessful, if the number of RLC retransmissions exceeds/meets a threshold, or other reasons. When RLF is triggered, the UE would, given certain conditions, attempt to re-establish its connection to the network. The UE also attempts to reestablish the connection to the network if for example a handover fails, etc. The re-establishment procedure is illustrated in FIG. 1.

When the UE attempts to reestablish the connection to the network, the UE sends a re-establishment request at 1:1 including the following information to the gNB towards which the UE attempts to re-establish the connection. It should be noted that this gNB may be another cell/gNB compared to the cell/gNB where the UE's connection has failed.

The re-establishment request comprises the following information:
   A UE Identity, ID, comprised of the Cell Radio Network Temporary Identifier, C-RNTI, and the Physical Cell Identifier, PCI, used to identify the UE context,
   A security token, referred to as shortMAC-I in the specification, which is used to identify and verify the UE at the RRC connection re-establishment.
   An indication of the cause that has triggered the re-establishment, e.g. handover failure, etc.

The gNB which serves the cell receiving this request is sometimes referred to as the target gNB, while the gNB to which the UE was connected before the failure is sometimes referred to as the source gNB. The target gNB would, based on the information provided by the UE, attempt to re-establish the connection. The target gNB may do this by determining which gNB is the source gNB considering the PCI part of the UE ID, and request that gNB to send the UE's context. In the request for UE context at 1:2, the target gNB provides, among other things, the UE ID and security token received from the UE as well as the target cell identity, Cell ID.

At 1:3, the source gNB then locates the UE context based on the UE ID and verifies the request based on the security token, see next section. If successful, the gNB forwards the UE context to the target gNB at 1:4, which then responds to the UE with RRC re-establishment at 1:5, to confirm the connection is being re-established. Finally, the UE acknowledges the reception of the RRC re-establishment by sending RRC re-establishment complete at 1:6. Thereby, the UE is able to transmit uplink (UL) data to the target gNB and the target gNB is able to transmit downlink (DL) data to the UE on the re-established connection, as indicated by respective dashed arrows.

Note that the RRC re-establishment procedure works in a similar way in LTE and eLTE (LTE connected to 5GC).

Security Token Calculation for RRC Connection Re-Establishment

The security token included in the RRC re-establishment request is verified by the source gNB and provides assurance to the network that the request originated from the correct UE. The security token is calculated using an integrity key $K_{RRCint}$, derived from the source gNB base key KgNB, with the following additional inputs:
   Source C-RNTI
   Source PCI
   Target Cell Identity, ID From a security perspective, the most important of the parameters above is the target Cell ID. The Cell ID uniquely identifies a cell within a Public Land Mobile Network, PLMN, and by including the target Cell ID in the calculation the security token is bound to the target cell. This ensures that the security token can only be used within the intended cell and if an attacker intercepts the security token, which could be done as the re-establishment requests are sent on SRB0, i.e., without encryption, and uses the intercepted security token in a request in some other cell, the request will be rejected since the target Cell ID is different from the Cell ID of said other cell.

The calculation of the security token, in NR called shortMAC-I which is represented by a 16 bit string, is described as follows in the RRC specification, see section 5.3.7.4 in TS 38.331 and R2-1813492, CR to 38.331 "Introduction of NR SA".

5.3.7.4 Actions related to transmission of RRCReestablishmentRequest message.

The UE shall set the contents of RRCReestablishmentRequest message as follows:

2> set the shortMAC-I to the 16 least significant bits of the MAC-I calculated:

3> over the ASN.1 encoded as per section 8 (i.e., a multiple of 8 bits) VarShortMAC-Input;

3> with the $K_{RRCint}$ key and integrity protection algorithm that was used in the source PCell (reconfiguration with sync or mobility from NR failure) or of the PCell in which the trigger for the re-establishment occurred (other cases); and 3> with all input bits for COUNT, BEARER and DIRECTION set to binary ones;

Furthermore, the input variables to the security token are described in detail as a UE variable called VarShortMAC-Input which is described as follows in the RRC specifications, see section 7.4 in TS 38.331 and R2-1813492, CR to 38.331 "Introduction of NR SA":

UE Variables:
VarShortMAC-Input

The UE variable VarShortMAC-Input specifies the input used to generate the shortMAC-I during RRC Connection Reestablishment procedure.

VarShortMAC-Input Variable

```
-- ASN1START
-- TAG-VAR-SHORTMACINPUT-START
VarShortMAC-Input    ::=    SEQUENCE {
    sourcePhysCellId         PhysCellId,
    targetCellIdentity       CellIdentity,
    source-c-RNTI            RNTI-Value
}
-- TAG-VAR-SHORTMACINPUT-STOP
-- ASN1STOP
```

VerShortMAC-Input Field Descriptions
fargetCellIdentity
Set to CellIdentity of the target cell i.e. the cell the UE is trying to reestablish the connection.
source-c-RNTI
Set to C-RNTI that the UE had in the PCell it was connected to prior to the reestablishment.
sourcePhysCellId
Set to the physical cell identity of the PCell the UE was connected to prior to the RRC connection.

As mentioned above, the security token is the 16 least significant bytes of the MAC-I. In LTE and NR, integrity protection of messages is performed in the Packet Data Convergence Protocol (PDCP) in both the network and the UE by computing a Message Authentication Code—Integrity (MAC-I) which is included in the PDCP header. The MAC-I is a secure checksum calculated using an integrity protection algorithm. When the receiver receives the PDCP packet, it computes and verifies the MAC-I using the same inputs and algorithms as the transmitter has used, so that each side can be authenticated. The derivations are specified in TS 33.401 and TS 33.501 for EPS and 5GS respectively, although the only difference is which algorithms are applied. For LTE connected to either EPC or 5GC, the algorithms used are defined in TS 33.401, while for NR, the algorithms used are defined in 33.501. Unlike the MAC-I which is included at and verified by the PDCP layer, the security token is included and verified at the RRC layer.

Below an excerpt from the 5G security specification (see section D.3.1.1 in TS 33.501 2. 3GPP TS 33.501 "Security architecture and procedures for 5G System", v15.1.0) for the derivation of the MAC-I:

Inputs and Outputs

The input parameters to the integrity algorithm are a 128-bit integrity key named KEY, a 32-bit COUNT, a 5-bit bearer identity called BEARER the 1-bit direction of the transmission i.e. DIRECTION, and the message itself i.e. MESSAGE. The DIRECTION bit shall be 0 for uplink and 1 for downlink. The bit length of the MESSAGE is LENGTH.

FIG. 2 illustrates Derivation of MAC-I/NAS-MAC (or XMAC-I/XNAS-MAC) to be used the integrity algorithm NIA to authenticate the integrity of messages.

Based on these input parameters, the sender of a message computes a 32-bit message authentication code (MAC-I/NAS-MAC) using the integrity algorithm NIA. The computed message authentication code is then appended to the message when sent. For integrity protection algorithms, the receiver of the message computes an expected message authentication code (XMAC-I/XNAS-MAC) on the message received in the same way as the sender computed its message authentication code on the message sent, and verifies the data integrity of the message by comparing the computed message authentication code to the received message authentication code, i.e. MAC-I/NAS-MAC. If the computed message authentication code matches the received message authentication code, the message is verified.

In FIG. 2, it is thus illustrated how the sender generates the message authentication code denoted MAC-I/NAS-MAC by using the parameters KEY, COUNT, MESSAGE, DIRECTION and BEARER as input to the NIA. In the same manner, the receiver generates the expected message authentication code denoted XMAC-l/XNAS-MAC by using the same parameters KEY, COUNT, MESSAGE, DIRECTION and BEARER as input to the same integrity algorithm NIA. The message is verified by the receiver if the received MAC-I/NAS-MAC matches, e.g. equals, the computed XMAC-I/XNAS-MAC.

However, it may be a problem that the above-described Cell ID is sometimes not globally unique across multiple PLMNs so that when the Cell ID is included in the security token calculation, the security token might not be bound to one and the same cell, resulting in reduced security in the network.

SUMMARY

It is an object of embodiments described herein to address at least some of the problems and issues outlined above. It is possible to achieve this object and others by using a UE, a source network node and methods therein, as defined in the attached independent claims.

According to one aspect, a method is performed by a User Equipment, UE, for re-establishing a Radio Resource Control, RRC, connection to a target cell in a wireless communications network. In this method, when the target cell has been found, the UE generates a security token, wherein an input value in a security token generating function comprises a set of input parameters, which set of input parameters comprises at least a cell identifier of the target cell and an indication of a Public Land Mobile Network, PLMN, of the target cell. The UE further sends a re-establishment request to a target network node serving the target cell, which re-establishment request comprises the security token.

According to another aspect, a User Equipment, UE, is configured for re-establishing a Radio Resource Control, RRC, connection to a target cell in a wireless communications network. When the target cell is found, the UE is configured to generate a security token, wherein an input value in a security token generating function is adapted to comprise a set of input parameters, which set of input parameters is adapted to comprise at least a cell identifier of the target cell and an indication of a Public Land Mobile Network, PLMN, of the target cell. The UE is further configured to send a re-establishment request to a target network node serving the target cell, which re-establishment request is adapted to comprise the security token.

According to another aspect, a method is performed by a source network node for re-establishing a Radio Resource Control, RRC, connection of a User Equipment, UE, to a target cell in a wireless communications network. In this method, the source network node receives from a target network node serving the target cell, a security token, and the source network node then generates a security token itself. When generating the security token, an input value in a security token generating function comprises a set of input parameters, which set of input parameters comprises at least a cell identifier of the target cell and an indication of a Public Land Mobile Network, PLMN, of the target cell. If the received security token is successfully verified when compared with the generated security token, the source network node provides to the target network node a UE context related to the RRC connection of the UE, to enable the target network node to re-establish the RRC connection.

According to another aspect, a source network node is configured for re-establishing a Radio Resource Control, RRC, connection of a User Equipment, UE, to a target cell in a wireless communications network. The source network node is configured to receive from a target network node serving the target cell, a security token, and to generate a security token. When generating the security token, an input value in a security token generating function is adapted to comprise a set of input parameters, which set of input parameters is adapted to comprise at least a cell identifier of the target cell and an indication of a Public Land Mobile Network, PLMN, of the target cell.

If the received security token is successfully verified when compared with the generated security token, the source network node is configured to provide to the target network node a UE context related to the RRC connection of the UE, to enable the target network node to re-establish the RRC connection.

When using either of the above methods, UE and source network node, it is an advantage that the security token generated by both the UE and the source network node indicates or represents a unique combination of the intended target cell and the PLMN of the target cell, so that the security token can only be used to re-establish a connection within the intended target cell. This effectively prevents an attacker, having intercepted the security token, to establish an RRC connection with some other cell by using the intercepted security token in an RRC re-establishment request. This is because the RRC re-establishment request will be rejected as the security token therein does not match the intended other cell.

The above methods, UE and source network node may be configured and implemented according to different optional embodiments to accomplish further features and benefits, to be described below.

A computer program is also provided comprising instructions which, when executed on at least one processor in either of the above nodes, cause the at least one processor to carry out the respective methods described above. A carrier is also provided which contains the above computer program, wherein the carrier is one of an electronic signal, an optical signal, an electromagnetic signal, a magnetic signal, an electric signal, a radio signal, a microwave signal, or a computer-readable storage medium. It should be noted that the above processor may also be referred to as a processing circuitry which is basically a synonym for processor. Throughout this description, the term processor could thus be substituted by "processing circuitry".

BRIEF DESCRIPTION OF DRAWINGS

The solution will now be described in more detail by means of exemplary embodiments and with reference to the accompanying drawings, in which:

FIGS. 8-13 illustrate further scenarios, structures and procedures that may be employed when the solution is used, according to further possible embodiments.

DETAILED DESCRIPTION

As a part of developing embodiments herein, various problems which have been identified in existing solutions for determining a security token, will now be discussed.

First, some existing solutions for security token calculation will be briefly described.

In NR, and also in LTE/eLTE, the security token needs to be calculated when a UE tries to re-establish an RRC connection. The UE may then use the parameters in the UE variable associated to the security token which contains the C-RNTI and PCI provided from the source cell and the target Cell ID obtained from the system information of the target cell. It may be noted that the field description of the Cell ID simply indicates that this is the cell the UE is trying to re-establish a connection to. That is, obtained from the system information associated to that cell, more precisely from SIB1, in cellAccessRelatedInfo in the case of NR.

If a single target Cell ID is being broadcasted, the currently specified solution is useful for providing security. However, in case of RAN sharing with multiple PLMNs sharing the same cell, there may be more than one Cell ID associated with a cell. For example, if two RANs PLMN A and PLMN B both share the same cell, PLMN A can use one Cell ID while PLMN B use another Cell ID. Compared to using a single common Cell ID, it is a benefit that the PLMNs may plan their networks without having to coordinate the Cell IDs for the cells in the respective networks. Which Cell ID to use as input to the security token calculation in a RAN sharing scenario e.g. focuses on RRC connection re-establishment and RAN sharing in LTE but most of the problems and solutions discussed herein apply to the NR case as well.

For example, either of the following two alternatives may be applied to determine which Cell ID to use as input to the security token calculation:
- the UE may use the Cell ID associated with the so-called primary PLMN which is the PLMN occurring first in the broadcasted PLMN list, and
- the UE may use the Cell ID associated with its selected PLMN which is the UE's registered PLMN or an equivalent PLMN.

Figure 1:
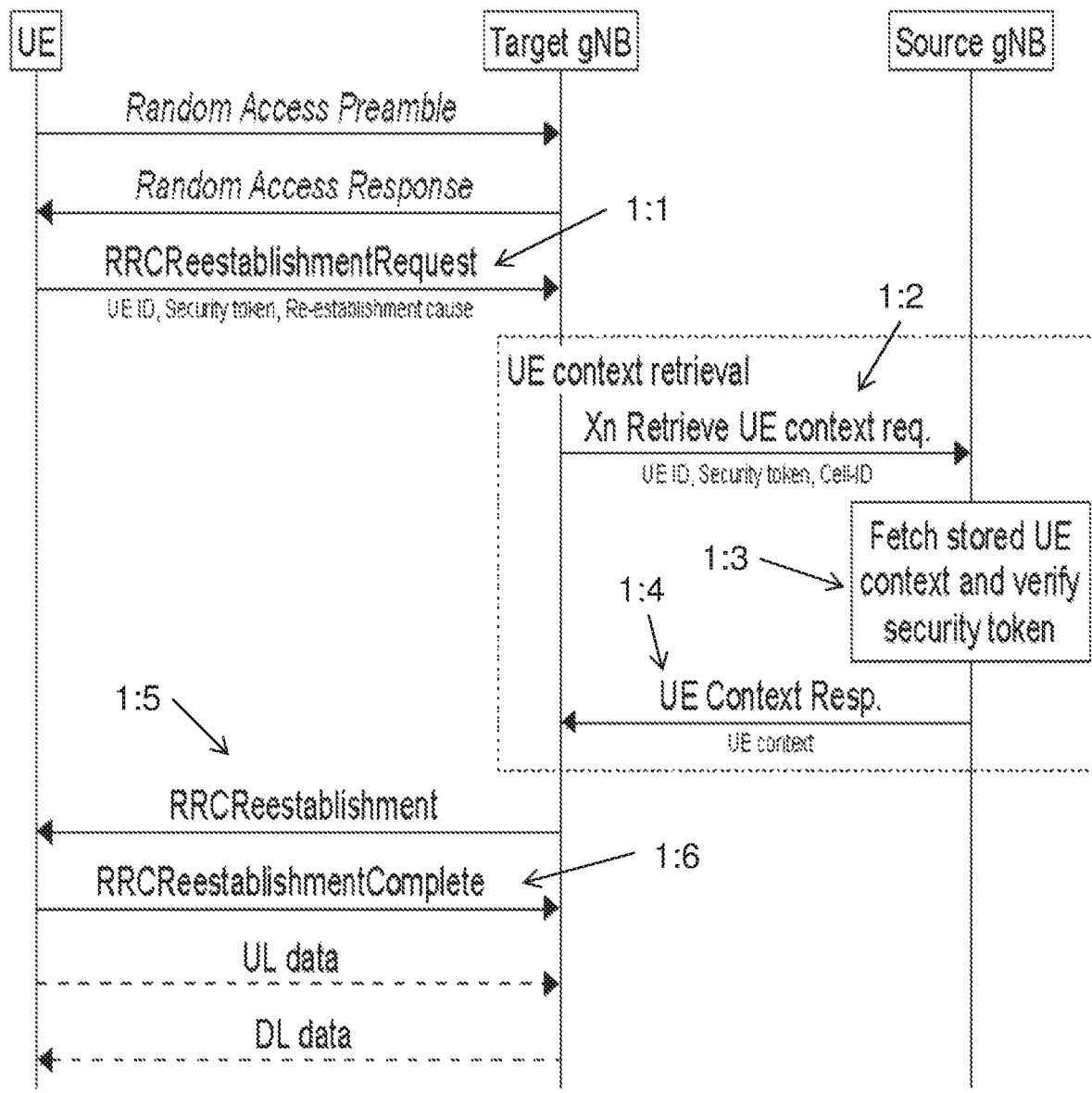
FIG. 1 is a communication sequence illustrating how a UE reestablishes a connection by sending an RRC reestablishment request to a target gNB, according to the prior art.
Figure 2:
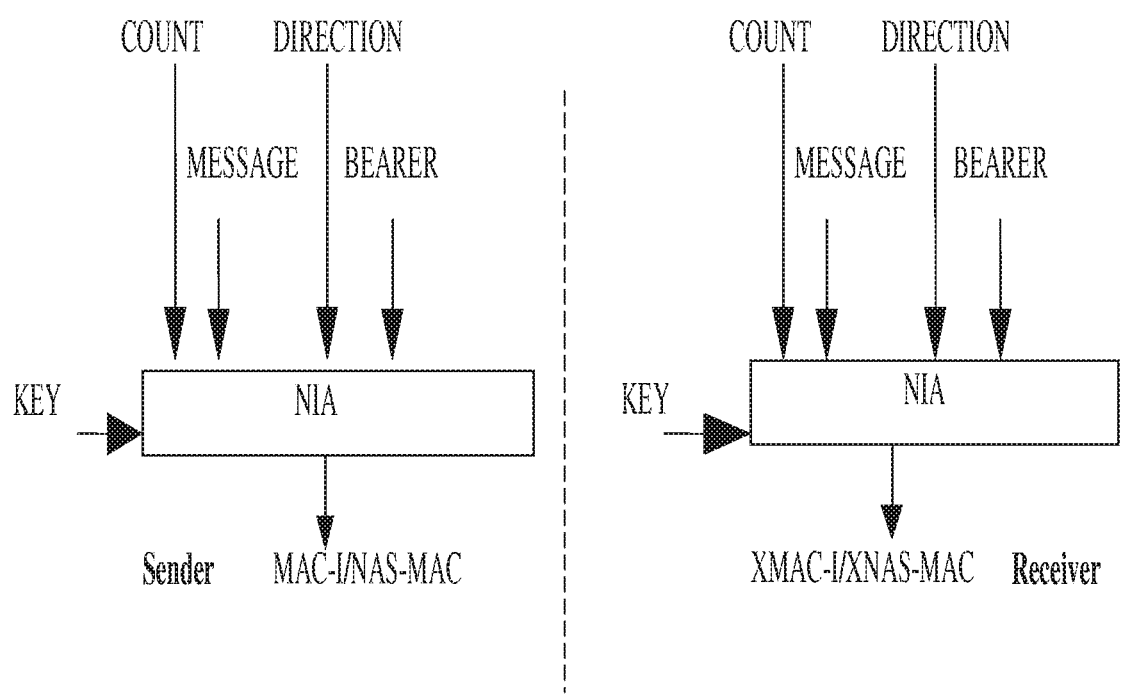
FIG. 2 illustrates how a message authentication code can be computed by a sender and by a receiver, respectively, which may be useful for the embodiments herein.

Using the Cell ID of the selected PLMN according to the second alternative above is arguably a preferable solution. However, the input parameters including the exact target cell ID to use for the calculation of the security token must be known at both the UE and at the source gNB, or any other network node that needs to verify the UE before sending the UE context to the target gNB, in order to enable safe verification of the security token. Further, it is not certain that the PLMN selected by the UE at the target cell is the same as the PLMN previously selected which can be part of the UE context. One reason for that difference in PLMNs could be when the UE reselects to an equivalent PLMN. In that case, that selected PLMN is only indicated to the network in the RRC re-establishment complete message, while the security token shall be computed by the network upon receiving RRC re-establishment request message which occurs at 1:1 before the RRC re-establishment complete message at 1:6, as shown in FIG. 1. This may be solved by using either of the following options:
- The UE can indicate the selected PLMN already in the RRC re-establishment request message. However, due the strict size constraint of the RRC re-establishment request message this option may not be possible to use.
- The source gNB includes the Cell IDs of all PLMNs in the Xn retrieve UE context request and the source gNB determines which one to use. This can be achieved by the source gNB by trying each Cell ID in turn until the token verification either succeeds or all Cell IDs have been attempted. Alternatively, the source gNB can use the information stored in the UE context to determine the registered PLMN and then use this information to determine the selected PLMN and the associated Cell ID.

Some problems that may occur when an existing solution for security token calculation, will now be identified.

An important security property of the security token used in RRC re-establishment is that the security token is only valid within a specific cell. This ensures that a security token that is intercepted in one cell by an attacker cannot be used to re-establish connection in another cell. As described above, this can be accomplished by including the Cell ID in the security token calculation. However, when RRC re-establishment is combined with RAN sharing of cells, the Cell ID no longer uniquely identifies a cell as the same Cell ID may be used by several PLMNs. The Cell ID collisions that may occur differ depending on which solution is adopted, i.e. which Cell ID that is used as input to the security token calculation according to either of Case 1 and Case 2 below:

Case 1: The primary PLMN Cell ID, which is the Cell ID associated with the first PLMN in the broadcasted PLAN list, is used as input to the security token calculation.

In this case, a security token generated in one cell will be valid also in another cell if the primary PLMN of the other cell uses the same Cell ID as the primary PLMN of the first cell. The same is true also when the Cell ID is selected according to similar rules, e.g. the Cell ID associated with the i:th PLMN in the broadcasted PLMN list.

Case 2: The selected PLAIN Cell ID, which is the Cell ID associated with the registered PLMN or an equivalent PLMN, is used as input to the security token calculation.

In this case a security token can be valid in more than one cell if the same Cell ID is used both in the registered PLMN and in one of its equivalent PLMNs or in two of the equivalent PLMNs.

An object of embodiments herein may therefore be to improve security of RRC re-establishment in a wireless communications network.

According to some example embodiments herein, to ensure that the security token can only be used within specific target cell a globally unique cell identifier is included in the token calculation. For example, one way to construct such a cell identifier is to combine the PLMN ID with the Cell ID, i.e. use the so-called Cell Global Identity (CGI). Other methods to construct such identifiers also exist for example by taking the hash of broadcasted system information or parts thereof.

It should be noted that although this disclosure mainly refers to RRC re-establishment in NR, a similar problem may also occur for RRC re-establishment in eLTE and LTE. The embodiments and examples described herein can be adapted to address the problem also in these other types of network.

The embodiments herein are also applicable in an inter-RAT context, i.e. the UE re-establishes connection in a Radio Access technology, RAT, different from the RAT it was previously connected to.

According to some example embodiments herein, to ensure that the security token in RRC re-establishment can only be used in the intended cell, i.e. the target cell in which the legitimate UE attempts to re-establish a connection and for which the security token was originally generated, the security token is bound to the target cell by including a globally unique cell identifier for the target cell in the security token calculation.

An advantage of embodiments herein may be achieved as follows:

The inclusion of a globally unique cell identifier in the security token calculation ensures that the security token can only be used to re-establish a connection within the intended cell. If an attacker intercepts the security token bound to one cell and attempts to use it in a RRC re-establishment request in some other cell, the RRC re-establishment request will be rejected since the globally unique cell identifier of the intercepted security token does not match that of the intended other target cell.

Other benefits of the solution may include:

Embodiments herein do not introduce any additional radio signaling, commonly referred to as overhead, since the inclusion of additional input to the security token calculation does not require any increase of the token size or additional messages over radio.

Thanks to the globally unique cell identifier, the solution prevents remote attacks, e.g. denial of service attacks, where an attacker is trying to disturb a user located somewhere else in the system.

Embodiments herein also avoid the need to coordinate Cell IDs among operators. Each operator can plan their own Cell IDs even in networks with shared cells where Cell ID collisions may occur. For example, there is no need to maintain a common data base for all cells, and no need to share internal cell planning strategies with any competing operator.

Figure 3:
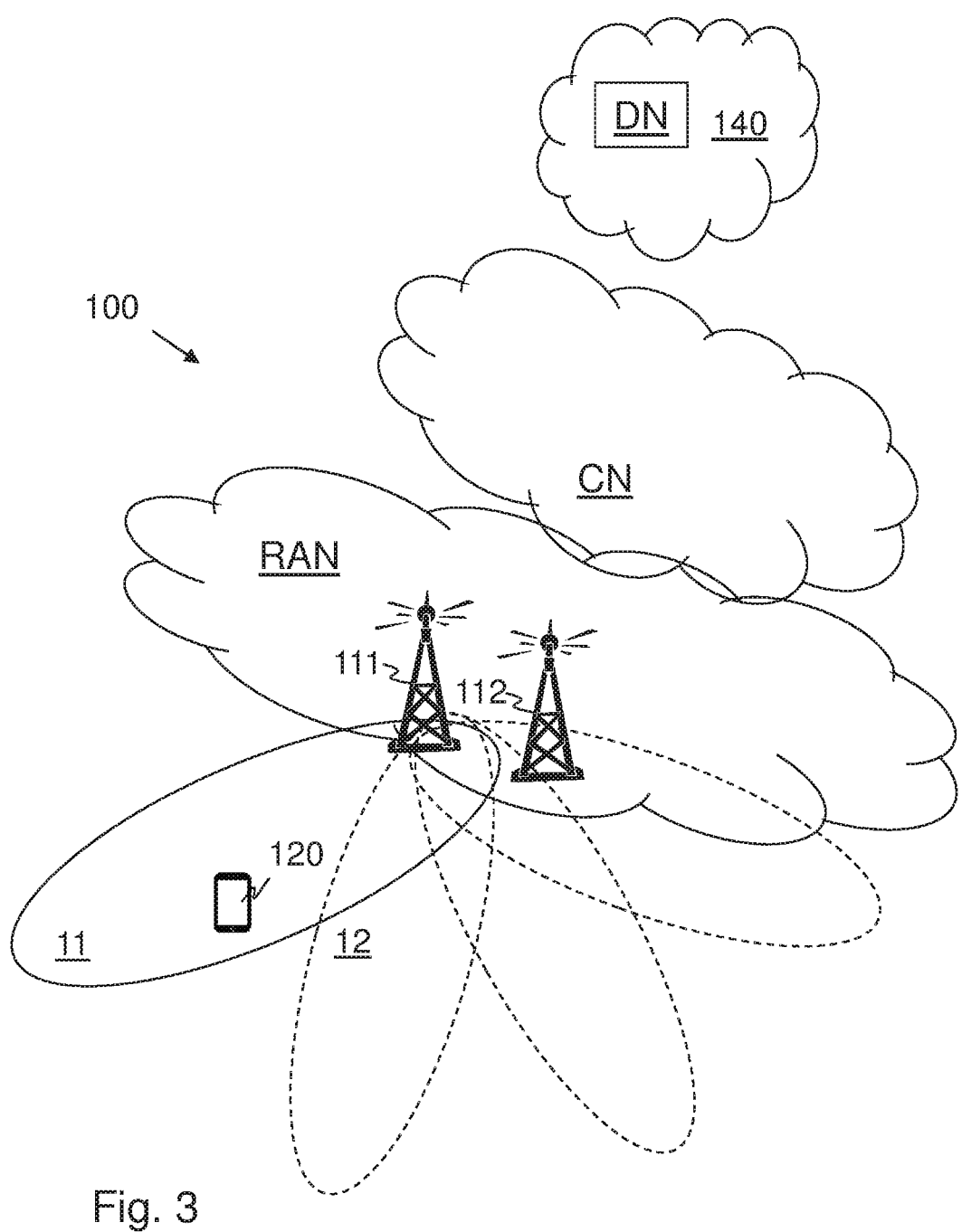
FIG. 3 is a schematic overview depicting a wireless communications network where the embodiments herein may be used.

Embodiments herein relate to wireless communications networks in general. FIG. 3 is a schematic overview depicting a wireless communications network 100. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communications network 100, UEs such as a UE 120 operate. The UE 120 may be a mobile station, a non-access point (non-AP) STA, a STA, a wireless terminal, which is capable to communicate via one or more Access Networks (AN), e.g. RAN, to one or more core networks (CN). It should be understood by the skilled in the art that "wireless device" is a non-limiting term which could denote any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell, Although the term UE is used when describing the examples and embodiments herein, the term wireless device could also be used as a synonym for UE.

The wireless communications network 100 comprises one or more radio network nodes such as a network node 111 and a network node 112, herein also referred to as a source network node 111 and a target network node 112, respectively, where each radio network node 111, 112 may provide radio communication in multiple Public Land Mobile Networks, PLMNs, and where each radio network node also provide radio coverage over a respective geographical area referred to as one or more cells 11, 12, which may also be referred to as a beam or a beam group of a first radio access technology (RAT), such as 5G, LTE, Wi-Fi or similar. Each of the source network node 111 and the target network node 112 may be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the source network node 111 and a target network node 112 depending e.g. on the first radio access technology and terminology used.

Methods herein may be performed by the UE 120 and the source network node 111. As an alternative, any Distributed Node (DN) and functionality, e.g. comprised in a cloud 140 as shown in FIG. 3, may be used for performing or partly performing the methods. The network aspects of embodiments herein may be deployed in a cloud environment.

Figure 4:
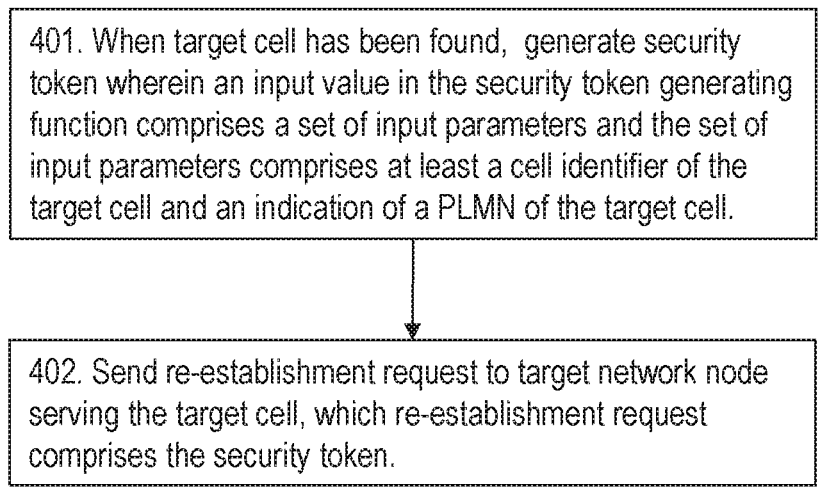
FIG. 4 is a flow chart illustrating a procedure in a UE, according to some example embodiments.

FIG. 4 shows an example method performed by the UE 120 for re-establishing an RRC connection to a target cell in the wireless communications network 100. In this method, the UE 120 performs the actions below.

In Action 401, when the target cell has been found, the UE 120 generates a security token wherein an input value in a security token generating function comprises a set of input parameters. The set of input parameters comprises at least a cell identifier of the target cell and an indication of a PLMN of the target cell. In this action, the target cell may e.g. be the same cell as a source cell in which the UE had a previous connection. Further, the cell identifier of the target cell may be a cell ID associated to the PLMN of the target cell.

In Action 402, the UE 120 sends a re-establishment request to the target network node 112 serving the target cell. The re-establishment request comprises the security token. This security token may in some embodiments then be sent from the target network node 112 to the source network node 111 to be verified, see below embodiments relating to FIG. 5.

Some further example embodiments that may be employed by the UE 120 in the method of FIG. 4 will now be described.

In some example embodiments, any of the cell identifier, and the indication of the PLMN of the target cell, which were mentioned above as possible input parameters in action 401, may be represented by any one or more out of the following:

a PLMN Identity, ID,
a Cell Identity, ID,
a hash and/or checksum of broadcasted system information or parts thereof comprising the PLMN and Cell ID information,
multiple PLMN IDs wherein the Cell identity comprises multiple Cell IDs,
a Tracking Area Code, TAC, associated to the PLMN, and
a RAN Area Code, RANAC, associated to the PLMN.

In some further example embodiments, the set of input parameters used in action 401 may further comprise:
a Tracking Area Code, TAC, associated to the PLMN, or
a RAN Area Code, RANAC, associated to the PLMN.

The above actions 401 and 402 may be implemented in the UE 120 by means of a computer program comprising instructions, which when executed by a processor, causes the processor to perform actions 401 and 402. This computer program may be comprised in a suitable carrier.

Figure 5:
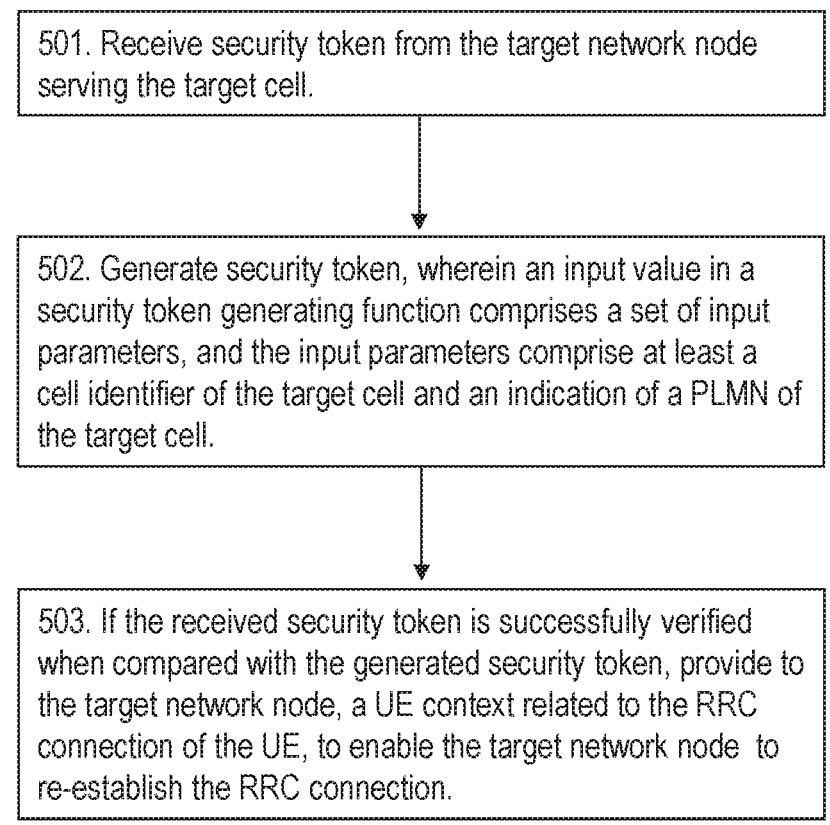
FIG. 5 is a flow chart illustrating a procedure in a source network node, according to further example embodiments.

FIG. 5 shows an example method performed by the source network node 111 for re-establishing an RRC connection of the UE 120 to a target cell in the wireless communications network 100. In this method, the source network node 111 performs the actions below.

In Action 501, the source network node 111 receives a security token from the target network node 112 serving the target cell. This action corresponds to the above action 402 where the UE 120 sends a re-establishment request comprising the security token to the source network node 111.

In Action 502, the target network node 112 generates a security token, wherein an input value in the security token generating function comprises a set of input parameters. The set of input parameters comprises at least a cell identifier of the target cell and an indication of a PLMN of the target cell.

In Action 503, if the received security token is successfully verified when compared with the generated security token, the source network node 111 provides to the target network node 112, a UE context related to the RRC connection of the UE 120, to enable the target network node 112 to re-establish the RRC connection.

The above actions 501-503 may be implemented in the source network node 111 by means of a computer program comprising instructions, which when executed by a processor, causes the processor to perform actions 501-503. This computer program may be comprised in a suitable carrier.

Some further example embodiments that may be employed by the source network node 111 in the method of FIG. 5 will now be described.

In some example embodiments, any of the cell identifier, and the indication of the PLMN of the target cell, which were mentioned above as possible input parameters in action 502, may be represented by any one or more out of the following:
 a PLMN Identity, ID,
 a Cell Identity, ID,
 a hash and/or checksum of broadcasted system information or parts thereof comprising the PLMN and Cell ID information,
 multiple PLMN IDs wherein the Cell identity comprises multiple Cell IDs,
 a Tracking Area Code, TAC, associated to the PLMN, and
 a RAN Area Code, RANAC, associated to the PLMN.

In some further example embodiments, the set of input parameters used in action 502 may further comprise:
 a Tracking Area Code, TAC, associated to the PLMN, or
 a RAN Area Code, RANAC, associated to the PLMN.

Some embodiments and examples of using a globally unique cell identifier based on combination of Cell ID and PLMN ID, will now be described.

To bind the security token to the target cell, a globally unique cell identifier is included in the security token calculation. As the PLMN ID uniquely identifies a PLMN and the Cell ID uniquely identifies a cell within a PLMN, a globally unique cell identifier can be formed by combining the PLMN ID and Cell ID, The PLMN ID does not need to be the PLMN the UE is connecting to or has been connected to, but preferably it may be associated with the Cell ID used in the security token calculation.

As described above, a cell may be shared by multiple PLMNs and it has also been described that the UE 120 may use either the Cell ID associated with the primary PLMN or the Cell ID associated with the selected PLMN, to generate the security token. Regardless of which one of the above alternatives is used, the UE 120 may use the PLMN ID associated with the Cell ID to construct the above-mentioned cell global identity CGI. This could be done according to either of the following alternatives:
 If the primary PLMN is used the cell global identity is formed or calculated from the primary PLMN's PLMN ID and Cell ID,
 If the selected PLMN is used the cell global identity is formed or calculated from the selected PLMN's PLMN ID and Cell ID.

In both alternatives, the combined cell identifier or cell global identity may be guaranteed to be globally unique and therefore achieves the intended purpose of creating a security token that is bound to the cell of the chosen PLMN.

Below is an example of how the embodiments above may be captured in the RRC specification (additions are marked as underlined). It is noted that the security token is denoted as shortMAC-I in the specification and the input parameters to the security token calculation are contained in an UE 120 variable called VarMAC-Input. At present the RRC specification is still not fully finished and therefore some of the parameter names may be changed in the RRC specification. The example below provides for both alternatives of using the primary PLMN and using the selected PLMN, as described above, although in the actual specification only one of these alternatives is likely to be included. Variations of the example below are also possible; for example, the target PLMN ID and Cell ID fields could be combined into a single field called targetCellGloball Identity or similar.
 UE Variables
 VarShortMAC-Input
 The UE variable VarShortMAC-Input specifies the input used to generate the shortMAC-I during RRC Connection Reestablishment procedure.

VarShortMAC-Input Variable

```
-- ASN1START
-- TAG-VAR-SHORTMACINPUT-START
VarShortMAC-Input   ::=           SEQUENCE {
    sourcePhysCellId              PhysCellId,
    targetPLMN-Identity           PLMN-Identity,
    targetCellIdentity            CellIdentity,
    source-c-RNTI                 RNTI-Value
}
-- TAG-VAR-SHORTMACINPUT-STOP
-- ASN1STOP
```

VarShortMAC-Input Field Descriptions targetPLMN-Identity
 Alternative 1: Set to PLMN identity of the primary PLMN i.e. the first PLMN in the PLMN lists in cell access related info in the target cell.
 Alternative 2: Set to PLMN identity of the selected PLMN i.e. the PLMN which the UE is connecting to in the target cell.
targetCellIdentity
 Set to CellIdentity of the target cell i.e. the cell the UE is trying to reestablish the connection.
source-c-RNTI
 Set to C-RNTI that the UE had in the PCell it was connected to prior to the reestablishment.
sourcePhysCellId
 Set to the physical cell identity of the PCell the UE was connected to prior to the RRC connection.

In some other embodiments, the UE 120 may include a hash/checksum of the broadcasted system information or parts thereof, e.g. only SIB1, in the security token calculation. As the system information (e.g. SIB1) includes the PLMN and Cell ID information the hash/checksum can also serve as a cell global identifier. In this embodiment, in order for the source network node 111 e.g. the source gNB, to be able to verify the security token when received, the target network node 112, e.g. the target gNB, may need to include the target cell system information, or its hash, together with the security token in an Xn retrieve UE context request sent to the source gNB.

In yet another embodiment, the UE 120 may include multiple PLMN IDs and/or Cell IDs in the security token calculation. In another example, all PLMN and/or Cell IDs could be included in the security token calculation. Using multiple PLMN IDs and/or Cell IDs in the security token calculation could ensure that the input parameters are unique, e.g. bound to the target cell, even in scenarios when the operator reuses Cell IDs outside the shared area. One example scenario where this could be useful is when the shared network is planned by a different legal/corporate entity, which still uses the main PLMN IDs of the operator sharing their network.

Some alternative embodiments of calculating a security token using other inputs instead or in addition to PLMN ID, will now be described.

tains a list of one or more PLMN Identities and additional information associated with those PLMNs. The total number of PLMNs in the PLMNIdentitynfoList does not exceed 12. The PLMN index is defined as $b1+b2+ \ldots +b(n-1)+i$ If this PLMN is included at the nth entry of PLMN-IdentityInfoList and the i-th entry of its corresponding PLMN-IdentityInfo, where b(j) is the number of PLMN-Identity entries in each PLMN-IdentityInfo respectively.

PLMN-IdentityInfoList

Includes a list of PLMN identity information.

PLMN-IdentityInfoList Information Element

```
-- ASN1START
-- TAG-PLMN-IDENTITY-LIST-START
PLMN-IdentityInfoList ::= SEQUENCE (SIZE (1..maxPLMN)) OF PLMN-IdentityInfo
PLMN-IdentityInfo ::=   SEQUENCE {
    plmn-IdentityList             SEQUENCE (SIZE (1..maxPLMN)) OF PLMN-Identity,
    trackingAreaCode              TrackingAreaCode    OPTIONAL, -- Need R
    ranac                         RAN-AreaCode    OPTIONAL,  -- Need R
    cellIdentity                  CellIdentity,
    cellReservedForOperatorUse    ENUMERATED {reserved, notReserved},
    ...
}
-- TAG-PLMN-IDENTITY-LIST-STOP
--ASN1STOP
```

Although the usage of the PLMN ID as input parameter for generating the security token has been mostly described, there may be embodiments applying a similar principle but including in the calculation of the security token other parameters, e.g., included in cell access related information in SIB1. That can be employed either in addition to the PLMN ID as described, or instead of using the PLMN ID. The parameters below may contribute to make the input to the security calculation unique in order to either provide a complement or an alternative to using the PLMN ID.

For reference, an excerpt from the RRC specification, see section 6.3.2 in TS 38.331 1. R2-1813492, CR to 38.331 "Introduction of NR SA", describing the cell access related info structure in SIB1 for NR, is provided below.

Radio Resource Control Information Elements

CellAccessRelatedInfo

The IE CellAccessRelatedInfo indicates cell access related information for this cell.

CellAccessRelatedInfo Information Element

PLMN-IdentityInfo Field Descriptions cellReservedForOperatorUse

Indicates whether the cell is reserved for operator use (per PLMN), as defined in 38.304 [20].

trackingAreaCode

Indicates Tracking Area Code to which the cell indicated by cellIdentity field belongs. The presence of the field indicates that the cell supports at least standalone operation; the absence of the field indicates that the cell only supports EN-DC functionality.

In some embodiments, the UE 120 may include the Tracking Area Code, TAC, associated to the first PLMN Identity Info element in the list within cell access related info, as input parameter for generating the security token. This has the benefit of preventing attacks outside the tracking area and could be useful if operator for some reason in the future would reuse Cell IDs in other tracking areas.

In some other embodiments, the UE 120 may include the RAN Area Code, RANAC, associated to the first PLMN

```
-- ASN1START
-- TAG-CELL-ACCESS-RELATED-INFO-START
CellAccessRelatedInfo    ::=SEQUENCE {
    plmn-IdentityList           PLMN-IdentityInfoList,
    cellReservedForOtherUse     ENUMERATED {true} OPTIONAL,   -- Need R
    ...
}
-- TAG-CELL-ACCESS-RELATED-INFO-STOP
--ASN1STOP
```

CellAccessRelatedInfo Field Descriptions cellReservedForOtherUse

Indicates whether the cell is reserved, as defined in 38.304 [20]. The field is applicable to all PLMNs.

plmn-IdentityList

The PLMN-IdentityList is used to configure a set of PLMN-IdentityInfo elements. Each of those elements con- Identity Info element in the list within cell access related info, as input parameter for generating the security token. This has the benefit of preventing attacks outside the RAN area and could be useful if operator for some reason in the future would reuse Cell IDs in other RAN areas.

In some other embodiments, the UE 120 may include the Tracking Area Code, TAC, associated to the selected PLAN Identity Info entry in the list within cell access related info, as input parameter for generating the security token. This has the benefit of preventing attacks outside the tracking area and could be useful if operator for some reason in the future would reuse Cell IDs in other tracking areas, In some other embodiment, the UE 120 may include the RAN Area Code, RANAC, associated to the selected PLMN Identity Info entry in the list within cell access related info, as input parameter for generating the security token. This has the benefit of preventing attacks outside the RAN area and could be useful if operator for some reason in the future would reuse Cell IDs in other RAN areas.

Some further embodiments that may be used for error handling when re-establishing an RRC connection of a UE 120 to a target cell, will now be described.

In further embodiments, upon detecting that there might be some ambiguity in which Cell ID is used for the context verification, the UE may perform different actions.

In one embodiment, before starting the re-establishment procedure, when the UE acquires system information in the target cell, e.g. cell access related information in SIB1, and detecting that there are multiple Cell IDs being broadcasted, e.g. associated to multiple PLMNs, the UE inform upper layers of a failure to re-establish and that NAS recovery is triggered. In other words, the UE enters RRC_IDLE from RRC_CONNECTED and instead of initiating an RRC re-establishment procedure, it initiates an RRC setup procedure. In this case, the RRC setup complete message could include some additional information concerning the failure so that the network could use it to refresh or "clean up" the UE context, A possible limitation of the above approach is that the re-establishment procedure may not be supported in a RAN sharing scenario, but it would simplify RRC specifications.

In another embodiment, before starting a re-establishment procedure, when the UE acquires system information in the target cell, e.g. cell access related information in SIB1, and detects that there are multiple Cell IDs being broadcasted, e.g. associated to multiple PLMNs, upon identifying that the UE needs to select an equivalent PLMN, i.e. change of PLMN compared to the one in the UE context known at the network, the UE informs upper layers about a failure to re-establish and that NAS recovery is triggered. In other words, the UE enters RRC_IDLE from RRC_CONNECTED and instead of initiating an RRC re-establishment procedure, the UE initiates an RRC connection setup procedure. A possible limitation of the latter approach is that the re-establishment procedure is supported in a RAN sharing scenario as long as the registered PLMN is being broadcasted in the target cell.

In another embodiment, before starting a re-establishment procedure, when the UE acquires system information in the target cell, e.g. cell access related information in SIB1, and detects that there are multiple Cell IDs being broadcasted, e.g. associated to multiple PLMNs, upon identifying that the UE needs to select an equivalent PLMN, i.e. change of PLMN compared to the one in the UE context known at the network, the UE indicates that occurrence to the network via a 1 bit flag, e.g. using RACH preambles, Thereby, the network can possibly provide a larger grant for the RRC re-establishment request, or alternatively directly perform a fallback procedure i.e. wait for an RRC re-establishment request and respond with an RRC setup so that the UE comes back via RRC_IDLE after informing upper layers about the fallback.

In yet another embodiment, before starting a re-establishment procedure, when the UE acquires system information in the target cell, e.g. cell access related information in SIB1, and detects that there are multiple Cell IDs being broadcasted, e.g. associated to multiple PLMNs, upon identifying that the UE needs to select an equivalent PLMN, change of PLMN compared to the one in the UE context known at the network, the UE indicates that occurrence to the network via a flag in the RRC re-establishment request. Thereby, the network can directly respond with an RRC setup, or, if the serving gNB and target gNB are the same node, the RRC re-establishment could anyway be provided as there would be no need for verification for the purpose of context fetching.

Figure 6A:
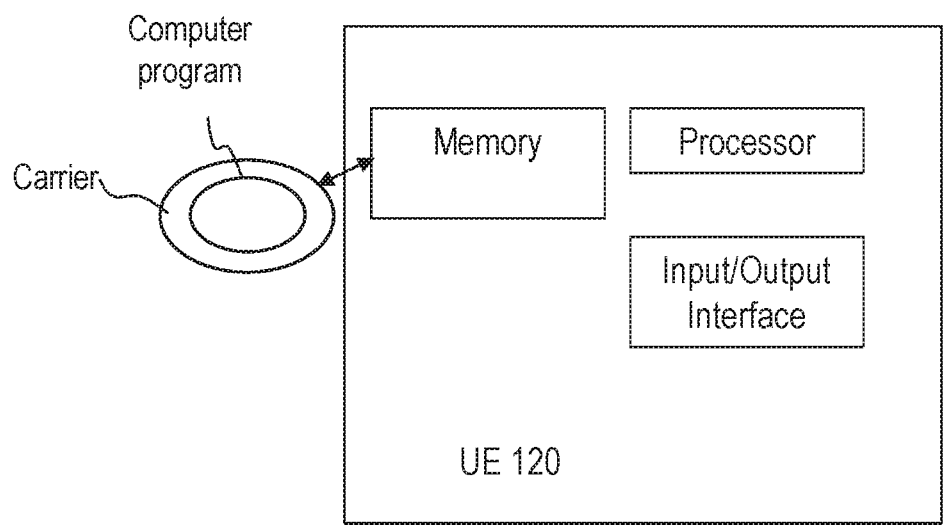
FIGS. 6a and 6b are block diagrams illustrating how a UE may be structured, according to further example embodiments.
Figure 6B:
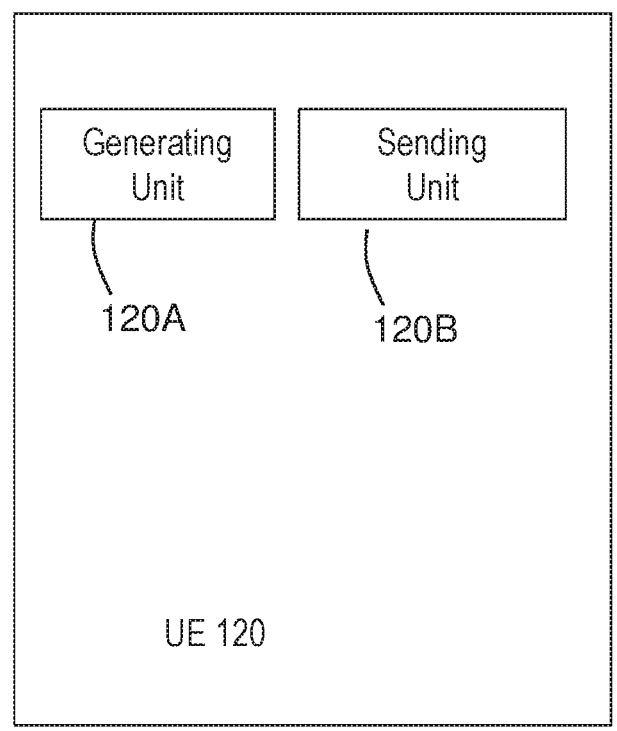

FIGS. 6a and 6b show examples of arrangements in the UE 120.

With reference to FIG. 6a, the UE 120 may comprise an input and output interface configured to communicate with each other. The input and output interface may comprise a wireless receiver (not shown) and a wireless transmitter (not shown).

With reference to FIG. 6b, the UE 120 may comprise a generating unit 120A and a sending unit 120B configured to perform the method actions of FIG. 4 as described herein.

In more detail, and with further reference to FIG. 3, the UE 120 of FIGS. 6a and 6b is configured for re-establishing an RRC connection to a target cell in a wireless communications network 100.

When the target cell is found, the UE 120 is configured to generate a security token, wherein an input value in a security token generating function is adapted to comprise a set of input parameters, which set of input parameters is adapted to comprise at least a cell identifier of the target cell and an indication of a PLMN of the target cell. This operation may be performed by the generating unit 120A, as also illustrated in action 401.

The UE 120 is further configured to send a re-establishment request to a target network node 112 serving the target cell, which re-establishment request is adapted to comprise the security token. This operation may be performed by the sending unit 120B, as also illustrated in action 402.

The embodiments herein may be implemented through a respective processor or one or more processors, such as the processor of a processing circuitry in the UE 120 depicted in FIG. 6a, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory comprising one or more memory units. The memory comprises instructions executable by the processor in the UE 120.

The memory is arranged to be used to store instructions, data, security tokens, parameters, configurations, and applications to perform the methods herein when being executed in the UE 120.

In some embodiments, a computer program comprises instructions, which when executed by the at least one processor, cause the at least one processor of the UE 120 to perform the actions above. As indicated above, the processor(s) of the UE 120 could also be denoted a processing circuitry.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional units in the UE 120, described below may refer to a combination of analog and digital circuits, and/or one or more processors configured with software and/or firmware, e.g. stored in the UE 120, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7A:
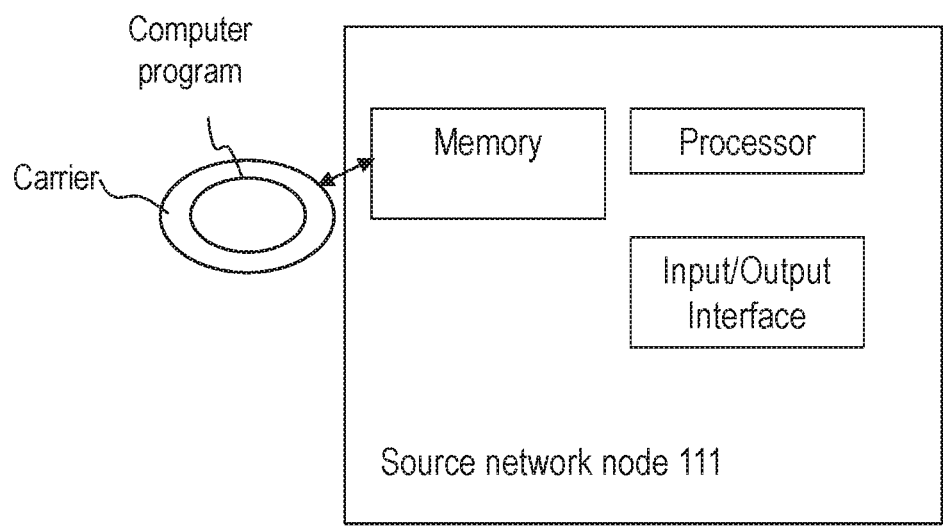
FIGS. 7a and 7b are block diagrams illustrating how a source network node may be structured, according to further example embodiments
Figure 7B:
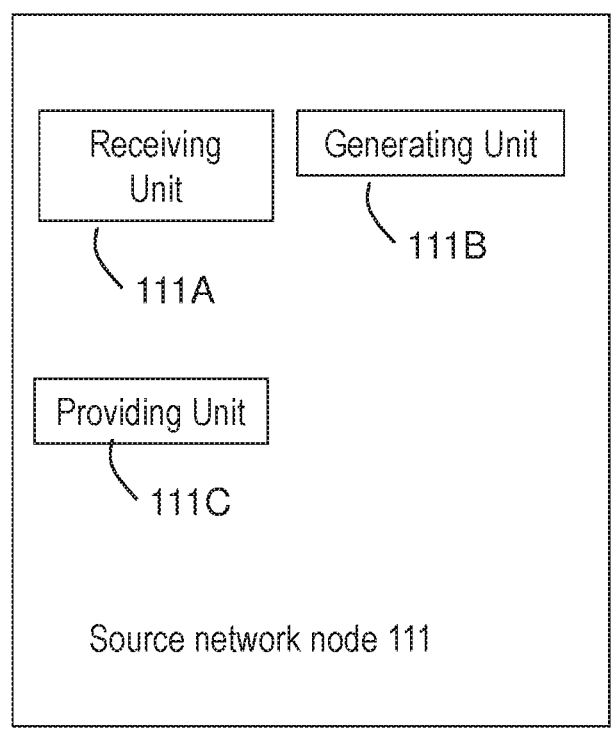

FIGS. 7a and 7b show examples of arrangements in the source network node 111.

With reference to FIG. 7a, the source network node 111 may comprise an input and output interface configured to communicate with each other. The input and output interface may comprise a wireless receiver (not shown) and a wireless transmitter (not shown).

With reference to FIG. 7b, the source network node 111 may comprise a receiving unit 111A, a generating unit 111B and a providing unit 111C configured to perform the method actions of FIG. 5 as described herein.

In more detail, and with further reference to FIG. 3, the source network node 111 is configured for re-establishing an RRC connection to a target cell in a wireless communications network 100.

The source network node 111 is configured to receive from a target network node 112 serving the target cell, a security token. This operation may be performed by the receiving unit 111A, as also illustrated in action 501.

The source network node 111 is also configured to generate a security token, wherein an input value in a security token generating function is adapted to comprise a set of input parameters, which set of input parameters is adapted to comprise at least a cell identifier of the target cell and an indication of a PLMN of the target cell. This operation may be performed by the generating unit 111B, as also illustrated in action 502.

if the received security token is successfully verified when compared with the generated security token, the source network node 111 is configured to provide to the target network node 112 a UE context related to the RRC connection of the UE 120, to enable the target network node 112 to re-establish the RRC connection. This operation may be performed by the providing unit 111C, as also illustrated in action 503.

The embodiments herein may be implemented through a respective processor or one or more processors, such as the processor of a processing circuitry in the source network node 111 depicted in FIG. 7a, together with respective computer program code for performing the functions and actions of the embodiments herein. The program code mentioned above may also be provided as a computer program product, for instance in the form of a data carrier carrying computer program code for performing the embodiments herein when being loaded into the source network node 111. One such carrier may be in the form of a CD ROM disc. It is however feasible with other data carriers such as a memory stick. The computer program code may furthermore be provided as pure program code on a server and downloaded to the source network node 111.

The source network node 111 may further comprise respective a memory comprising one or more memory units.

The memory comprises instructions executable by the processor in the source network node 111.

The memory is arranged to be used to store instructions, data, security tokens, parameters, configurations, and applications to perform the methods herein when being executed in the source network node 111.

In some embodiments, a computer program comprises instructions, which when executed by the at least one processor, cause the at least one processor of the source network node 111 to perform the actions above. As indicated above, the processor(s) of the source network node 111 could also be denoted a processing circuitry.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional units in the source network node 111, described below may refer to a combination of analog and digital circuits, and/or one or more processors configured with software and/or firmware, e.g. stored in the UE 120, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Throughout this description, when using the word "comprise" or "comprising" it shall be interpreted as non-limiting, i.e. meaning "consist at least of".

The embodiments herein are not limited to the above described preferred embodiments. Various alternatives, modifications and equivalents may be used.

Below, some numbered example embodiments 1-20 are shortly described. See e.g. FIGS. 3, 4, 5, 6a and 6b, and 7a and 7b.

Embodiment 1. A method performed by a User Equipment, UE, 120 e.g. for re-establishing a Radio Resource Control, RRC, connection to a target cell in a wireless communications network 100, the method comprising: when the target cell has been found such as identified, the target cell and source cell may e.g. be the same, generating 401 a security token, wherein an input value in the security token generating function comprises a set of input parameters, which set of input parameters comprises at least a cell identifier, e.g. a cell ID, preferably associated to the PLMN, of the target cell and an indication of a Public Land Mobile Network PLMN of the target cell, sending 402 a re-establishment request to a target network node 112 serving the target cell, which re-establishment request comprises the security token.

Embodiment 2. The method according to embodiment 1, wherein any of the cell identifier, and the indication of the PLMN of the target cell is represented by any one or more out of:

PLMN Identity, ID, e.g. the PLMN ID of the first PLMN or the selected PLMN, a cell ID, a hash and/or checksum of broadcasted system information or parts thereof, e.g. SIB1, comprising the PLMN and Cell ID information, multiple PLMN IDs and/or and wherein the cell identity comprises multiple Cell IDs Tracking Area Code TAC associated to the PLMN, e.g, the first PLMN or the selected PLMN, the RAN Area Code RANAC associated to the PLMN, e.g. the first PLMN or the selected PLMN.

Embodiment 3. The method according to any of the embodiments 1-2, wherein the set of input parameters further comprises:

a Tracking Area Code TAC associated to the PLMN, e.g. the first PLMN or the selected PLMN, a RAN Area Code RANAC associated to the PLMN, e.g. the first PLMN or the selected PLMN Embodiment 4. A computer program comprising instructions, which when executed by a processor, causes the processor to perform actions according to any of the embodiments 1-3.

Embodiment 5. A carrier comprising the computer program of embodiment 4, wherein the carrier is one of an electronic signal, an optical signal, an electromagnetic signal, a magnetic signal, an electric signal, a radio signal, a microwave signal, or a computer-readable storage medium.

Embodiment 6. A method performed by a network node such as a source network node 111 e.g. for re-establishing a Radio Resource Control, RRC, connection of a UE 120 to a target cell in a wireless communications network 100, the method comprising:

receiving 501 from a target network node 112 serving the target cell, a security token, generating 502 a security token, wherein an input value in the security token generating function comprises a set of input parameters, which input parameters comprises at least a cell identifier, e.g. a cell ID, of the target cell and an indication of a PLMN of the target cell, if the received security token is successfully verified when compared with the generated security token, providing 503 to the target network node 112 a UE context related to the RRC connection of the UE 120, to enable the target network node 112 to re-establish the RRC connection.

Embodiment 7. The method according to embodiment 6, wherein any of the cell identifier, and the indication of the PLMN of the target cell is represented by any one or more out of:

PLMN Identity, ID, e.g. the PLMN ID of the first PLMN or the selected PLMN, a cell ID, a hash and/or checksum of broadcasted system information or parts thereof, e.g. SIB1, comprising the PLMN and Cell ID information, multiple PLMN IDs and/or and wherein the cell identity comprises multiple Cell IDs Tracking Area Code TAC associated to the PLMN, e.g. the first PLMN or the selected PLMN, the RAN Area Code RANAC associated to the PLMN, e.g. the first PLMN or the selected PLMN.

Embodiment 8. The method according to any of the embodiments 6-7, wherein the set of input parameters further comprises:

a Tracking Area Code TAC associated to the PLMN, e.g. the first PLMN or the selected PLMN, a RAN Area Code RANAC associated to the PLMN, e.g. the first PLMN or the selected PLMN Embodiment 9. A computer program comprising instructions, which when executed by a processor, causes the processor to perform actions according to any of the embodiments 6-8.

Embodiment 10. A carrier comprising the computer program of embodiment 9, wherein the carrier is one of an electronic signal, an optical signal, an electromagnetic signal, a magnetic signal, an electric signal, a radio signal, a microwave signal, or a computer-readable storage medium.

Embodiment 11. A method performed by a User Equipment, UE, 120 e.g. for any one out of re-establishing and resuming, a Radio Resource Control, RRC, connection to a target cell in a wireless communications network 100, the method comprising:

when the target cell has been found such as identified, the target cell and source cell may e.g. be the same, generating 401 a security token, wherein an input value in the security token generating function comprises a set of input parameters, which set of input parameters comprises at least a cell identifier, e.g. a cell ID, preferably associated to the PLMN, of the target cell and an indication of a Public Land Mobile Network PLMN of the target cell, sending 402 any one out of a re-establishment and resuming, request to a target network node 112 serving the target cell, which any one out of a re-establishment and resuming, request comprises the security token.

Embodiment 12. A method performed by a source network node 111 e.g. for any one out of re-establishing and resuming a Radio Resource Control, RRC, connection of a UE 120 to a target cell in a wireless communications network 100, the method comprising:

receiving 501 from a target network node 112 serving the target cell, a security token, generating 502 a security token, wherein an input value in the security token generating function comprises a set of input parameters, which input parameters comprises at least a cell identifier, e.g. a cell ID, of the target cell and an indication of a PLMN of the target cell, if the received security token is successfully verified when compared with the generated security token, providing 503 to the target network node 112 a UE context related to the RRC connection of the UE 120, to enable the target network node 112 to any one out of re-establish and resume the RRC connection.

Embodiment 13. A User Equipment, UE, 120 configured e.g. for re-establishing a Radio Resource Control, RRC, connection to a target cell in a wireless communications network 100, the UE 120 being configured to:

when the target cell is found such as identified, the target cell and source cell may e.g, be the same, generate a security token, wherein an input value in the security token generating function is adapted to comprise a set of input parameters, which set of input parameters is adapted to comprise at least a cell identifier, e.g. a cell ID, preferably associated to the PLMN, of the target cell and an indication of a Public Land Mobile Network PLMN of the target cell, e.g. by means of a generating unit in the UE 120, send a re-establishment request to a target network node 112 serving the target cell, which re-establishment request is adapted to comprise the security token, e.g. by means of a sending unit in the UE 120.

Embodiment 14. The UE according to embodiment 13, wherein any of the cell identifier, and the indication of the PLMN of the target cell is adapted to be represented by any one or more out of:

a PLMN Identity, ID, e.g, the PLMN ID of the first PLMN or the selected PLMN, a cell ID, a hash and/or checksum of broadcasted system information or parts thereof, e.g. SIB1, comprising the PLMN and Cell ID information, multiple PLMN IDs and/or and wherein the cell identity comprises multiple Cell IDs a Tracking Area Code TAC associated to the PLMN, e.g. the first PLMN or the selected PLMN, and a RAN Area Code RANAC associated to the PLMN, e.g. the first PLMN or the selected PLMN.

Embodiment 15. The UE according to any of the embodiments 13-14, wherein the set of input parameters further are adapted to comprise:

a Tracking Area Code TAC associated to the PLMN, e.g. the first PLMN or the selected PLMN, a RAN Area Code RANAC associated to the PLMN, e.g. the first PLMN or the selected PLMN Embodiment 16. A source network node 111 configured e.g. for re-establishing a Radio Resource Control, RRC, connection of a UE 120 to a target cell in a wireless communications network 100, the source network node 111 being configured to:

receive from a target network node 112 serving the target cell, a security token, e.g. by means of a receiving unit in the source network node 111.

generate a security token, wherein an input value in the security token generating function is adapted to comprise a set of input parameters, which input parameters is adapted to comprise at least a cell identifier, e.g. a cell ID, of the target cell and an indication of a PLMN of the target cell, e.g. by means of a generating unit in the source network node 111, if the received security token is successfully verified when compared with the generated security token, provide to the target network node 112 a UE context related to the RRC connection of the UE 120, to enable the target network node 112 to re-establish the RRC connection, e.g. by means of a providing unit in the source network node 111.

Embodiment 17. The source network node 111 according to embodiment 16, wherein any of the cell identifier, and the indication of the PLMN of the target cell is adapted to be represented by any one or more out of:

a PLMN Identity, ID, e.g., the PLMN ID of the first PLMN or the selected PLMN, a cell ID, a hash and/or checksum of broadcasted system information or parts thereof, e.g. SIB1, comprising the PLMN and Cell ID information, multiple PLMN IDs and/or and wherein the cell identity comprises multiple Cell IDs a Tracking Area Code TAC associated to the PLMN, e.g. the first PLMN or the selected PLMN, and a RAN Area Code RANAC associated to the PLMN, e.g. the first PLMN or the selected PLMN.

Embodiment 18. The method according to any of the embodiments 16-17, wherein the set of input parameters are adapted to further comprise:

a Tracking Area Code TAC associated to the PLMN, e.g. the first PLMN or the selected PLMN, a RAN Area Code RANAC associated to the PLMN, e.g. the first PLMN or the selected PLMN.

Embodiment 19. A User Equipment, UE, 120 configured e.g. for any one out of re-establishing and resuming a Radio Resource Control, RRC, connection to a target cell in a wireless communications network 100, the UE 120 being configured to:

when the target cell has been found such as identified, the target cell and source cell may e.g. be the same, generate a security token, wherein an input value in the security token generating function is adapted to comprise a set of input parameters, which set of input parameters is adapted to comprise at least a cell identifier, e.g. a cell ID, preferably associated to the PLMN, of the target cell and an indication of a Public Land Mobile Network PLMN of the target cell, e.g. by means of a generating unit in the UE 120, and send any one out of a re-establishment and resuming request to a target network node 112 serving the target cell, which any one out of a re-establishment and resuming request comprises the security token, e.g. by means of a sending unit in the UE 120.

Embodiment 20. A network node such as a source network node 111 configured e.g. for any one out of re-establishing and resuming a Radio Resource Control, RRC, connection of a UE 120 to a target cell in a wireless communications network 100, the source network node 111 being configured to:

receive from a target network node 112 serving the target cell, a security token, e.g. by means of a receiving unit in the source network node 111, generate a security token, wherein an input value in the security token generating function is adapted to comprise a set of input parameters, which input parameters is adapted to comprise at least a cell identifier, e.g. a cell ID, of the target cell and an indication of a PLMN of the target cell, e.g. by means of a generating unit in the source network node 111, if the received security token is successfully verified when compared with the generated security token, provide to the target network node 112 a UE context related to the RRC connection of the UE 120, to enable the target network node 112 to any one out of re-establish and resume the RRC connection, e.g. by means of a providing unit in the source network node 111.

Some further extensions and variations where the above-described embodiments and examples could be employed, will now be described.

Figure 8:
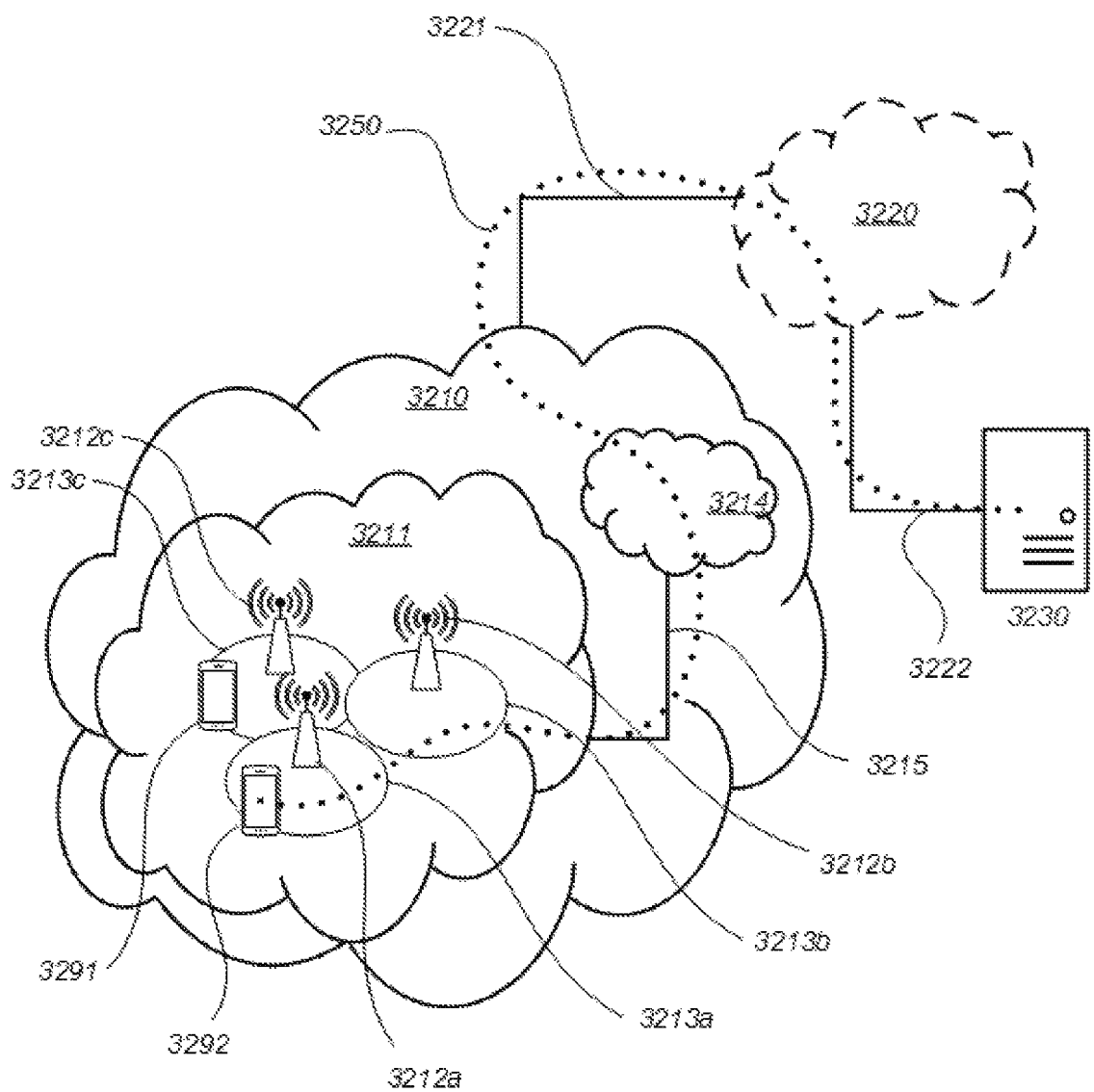

With reference to FIG. 8, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, 130, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 120 such as a Non-AP STA 3291 located in coverage area 3213*c* is configured to wirelessly connect to, or be paged by, the corresponding base station 3212*c*. A second UE 3292 e.g. the wireless device 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
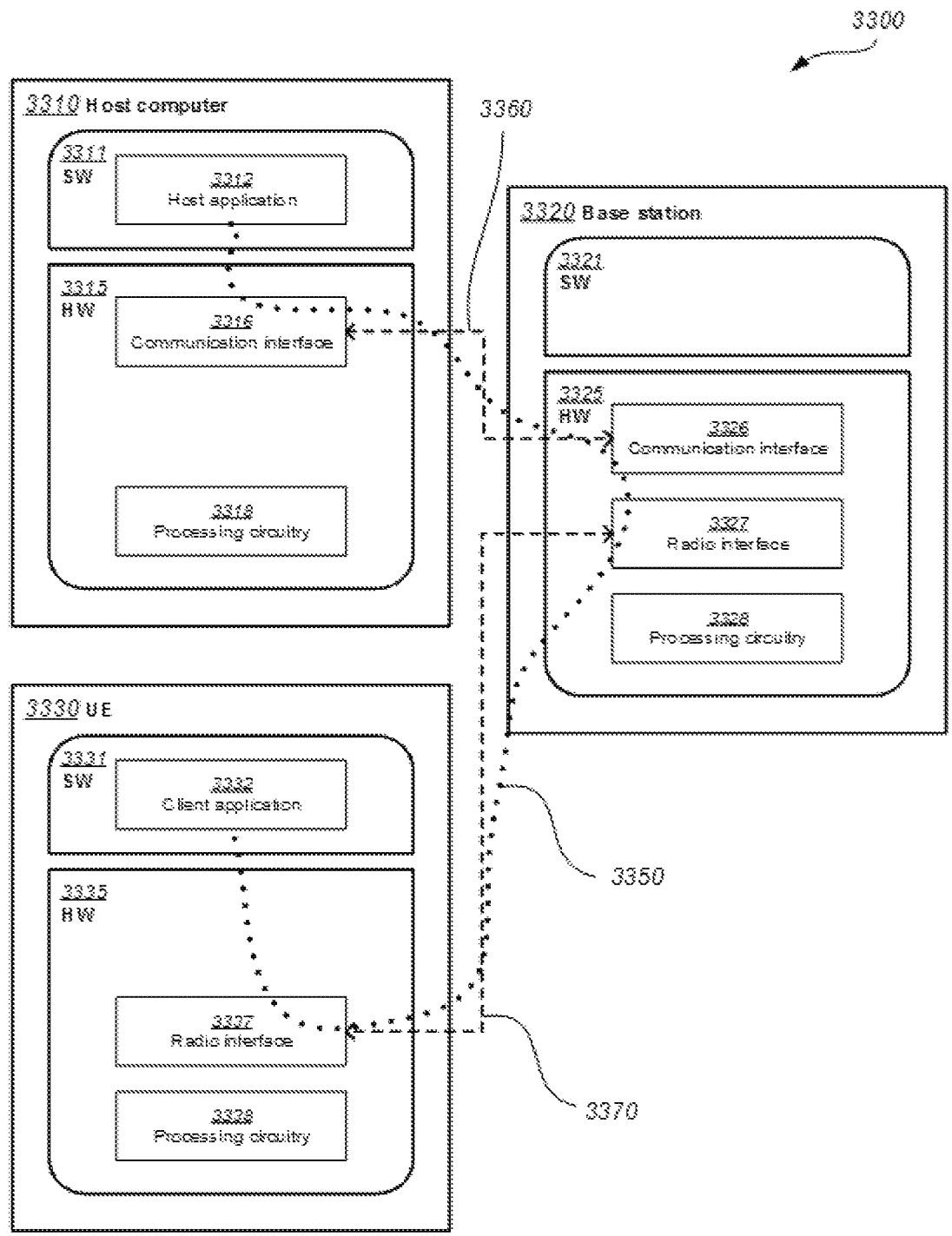

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 10, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station such as the network node 110, and a UE such as the UE 120, which may be those described with reference to FIG. 8 and FIG. 9, For simplicity of the present disclosure, only drawing references to FIG. 10 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 11 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission, FIG. 12 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 12 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 13 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

Some further numbered example embodiments A1-A6 and B1-B6 of the solution will now be outlined as further suggestions of how apparatuses may be configured to implement the above-described UE and source network node, respectively.

Embodiment A1: A User Equipment, UE, (120) configured for re-establishing a Radio Resource Control, RRC, connection to a target cell in a wireless communications network (100), the UE (120) comprising processing circuitry configured to:
when the target cell is found, generate a security token, wherein an input value in a security token generating function is adapted to comprise a set of input parameters, which set of input parameters is adapted to comprise at least a cell identifier of the target cell and an indication of a Public Land Mobile Network, PLMN, of the target cell, and
send a re-establishment request to a target network node (112) serving the target cell, which re-establishment request is adapted to comprise the security token, Embodiment A2: The UE according to embodiment A1, wherein any of the cell identifier, and the indication of the PLMN of the target cell is adapted to be represented by any one or more out of:
a PLMN Identity, ID,
a Cell Identity, ID,
a hash and/or checksum of broadcasted system information or parts thereof comprising the PLMN and Cell ID information,
multiple PLMN IDs wherein the Cell identity comprises multiple Cell IDs,
a Tracking Area Code, TAC, associated to the PLMN, and
a RAN Area Code, RANAC, associated to the PLMN, Embodiment A3: The UE according to any of the embodiments A1-A2, wherein the set of input parameters is adapted to further comprise:
a Tracking Area Code, TAC, associated to the PLMN, or
a RAN Area Code, RANAC, associated to the PLMN, Embodiment A4: A source network node (111) configured for re-establishing a Radio Resource Control, RRC, connection of a User Equipment, UE, (120) to a target cell in a wireless communications network (100), the source network node (111) comprising processing circuitry configured to:
  receive from a target network node (112) serving the target cell, a security token,
  generate a security token, wherein an input value in a security token generating function is adapted to comprise a set of input parameters, which set of input parameters is adapted to comprise at least a cell identifier of the target cell and an indication of a Public Land Mobile Network, PLMN, of the target cell, and
  if the received security token is successfully verified when compared with the generated security token, provide to the target network node (112) a UE context related to the RRC connection of the UE (120), to enable the target network node (112) to re-establish the RRC connection.

Embodiment A5: The source network node (111) according to embodiment A4, wherein any of the cell identifier, and the indication of the PLMN of the target cell is adapted to be represented by any one or more out of:
  a PLMN Identity, ID,
  a Cell Identity, ID,
  a hash and/or checksum of broadcasted system information or parts thereof comprising the PLMN and Cell ID information,
  multiple PLMN IDs wherein the Cell identity comprises multiple Cell IDs,
  a Tracking Area Code, TAC, associated to the PLMN, and
  a RAN Area Code, RANAC, associated to the PLMN.

Embodiment A6: The source network node (111) according to any of the embodiments A4-A5, wherein the set of input parameters is adapted to further comprise:
  a Tracking Area Code, TAC, associated to the PLMN, or
  a RAN Area Code, RANAC, associated to the PLMN.

Embodiment B1: A User Equipment, UE, (120) configured for re-establishing a Radio Resource Control, RRC, connection to a target cell in a wireless communications network (100), the UE (120) comprising:
  a generating unit (120A) configured to, when the target cell is found, generate a security token, wherein an input value in a security token generating function is adapted to comprise a set of input parameters, which set of input parameters is adapted to comprise at least a cell identifier of the target cell and an indication of a Public Land Mobile Network, PLMN, of the target cell, and
  a sending unit (120B) configured to send a re-establishment request to a target network node (112) serving the target cell, which re-establishment request is adapted to comprise the security token.

Embodiment B2: The UE according to embodiment B1, wherein any of the cell identifier, and the indication of the PLMN of the target cell is adapted to be represented by any one or more out of:
  a PLMN Identity, ID,
  a Cell Identity, ID,
  a hash and/or checksum of broadcasted system information or parts thereof comprising the PLMN and Cell ID information,
  multiple PLMN IDs wherein the Cell identity comprises multiple Cell IDs,
  a Tracking Area Code TAC associated to the PLMN, and
  a RAN Area Code RANAC associated to the PLMN.

Embodiment B3: The UE according to any of the embodiments B1-B2, wherein the set of input parameters is adapted to further comprise:
  a Tracking Area Code, TAC, associated to the PLMN, or
  a RAN Area Code, RANAC, associated to the PLMN, Embodiment B4: A source network node (111) configured for re-establishing a Radio Resource Control, RRC, connection of a User Equipment, UE, (120) to a target cell in a wireless communications network (100), the source network node (111) comprising:
  a receiving unit (111A) configured to receive from a target network node (112) serving the target cell, a security token,
  a generating unit (111B) configured to generate a security token, wherein an input value in a security token generating function is adapted to comprise a set of input parameters, which set of input parameters is adapted to comprise at least a cell identifier of the target cell and an indication of a Public Land Mobile Network, PLMN, of the target cell, and
  a providing unit (111C) configured to, if the received security token is successfully verified when compared with the generated security token, provide to the target network node (112) a UE context related to the RRC connection of the UE (120), to enable the target network node (112) to re-establish the RRC connection.

Embodiment B5: The source network node (111) according to embodiment B4, wherein any of the cell identifier, and the indication of the PLMN of the target cell is adapted to be represented by any one or more out of:
  a PLMN Identity, ID,
  a Cell Identity, ID,
  a hash and/or checksum of broadcasted system information or parts thereof, e.g. SIB1, comprising the PLMN and Cell ID information,
  multiple PLMN IDs wherein the Cell identity comprises multiple Cell IDs,
  a Tracking Area Code, TAC, associated to the PLMN, and
  a RAN Area Code, RANAC, associated to the PLMN.

Embodiment B6: The source network node (111) according to any of the embodiments B4-B5, wherein the set of input parameters is adapted to further comprise:
  a Tracking Area Code, TAC, associated to the PLMN, or
  a RAN Area Code, RANAC, associated to the PLMN.

The invention claimed is:

1. A method performed by a User Equipment (UE) for re-establishing a Radio Resource Control (RRC) connection to a target cell in a wireless communications network, the method comprising:
  when the target cell has been found, generating a security token, wherein an input value in a security token generating function comprises a set of input parameters, which set of input parameters comprises at least a cell identifier of the target cell and an indication of a Public Land Mobile Network (PLMN) of the target cell, and
  sending a re-establishment request to a target network node serving the target cell, which re-establishment request comprises the security token;
wherein the set of input parameters further comprises:
  a Tracking Area Code (TAC) associated to the PLMN, or
  a RAN Area Code (RANAC) associated to the PLMN.

2. The method of claim 1, wherein any of the cell identifier and the indication of the PLMN of the target cell is represented by any one or more out of:
  a PLMN identity,
  a Cell identity,
  a hash and/or checksum of broadcasted system information or parts thereof comprising the PLMN identity and Cell identity,
  multiple PLMN identities and multiple Cell identities,
  a Tracking Area Code (TAC) associated to the PLMN, and
  a RAN Area Code (RANAC) associated to the PLMN.

3. A non-transitory computer-readable comprising, stored thereupon, a computer program comprising instructions configured so that, when executed by a processor, the instructions cause the processor to perform the method of claim 1.

4. A method performed by a source network node for re-establishing a Radio Resource Control (RRC) connection of a User Equipment (UE) to a target cell in a wireless communications network, the method comprising:
receiving from a target network node serving the target cell, a security token,
generating a security token, wherein an input value in a security token generating function comprises a set of input parameters, which set of input parameters comprises at least a cell identifier of the target cell and an indication of a Public Land Mobile Network (PLMN) of the target cell,
if the received security token is successfully verified when compared with the generated security token, providing to the target network node a UE context related to the RRC connection of the UE, to enable the target network node to re-establish the RRC connection;
wherein the set of input parameters further comprises:
a Tracking Area Code (TAC) associated to the PLMN, or
a RAN Area Code (RANAC) associated to the PLMN.

5. The method of claim 4, wherein any of the cell identifier and the indication of the PLMN of the target cell is represented by any one or more out of:
a PLMN identity,
a Cell identity,
a hash and/or checksum of broadcasted system information or parts thereof comprising a PLMN identity and a Cell identity,
multiple PLMN identities and multiple Cell identifiers,
a Tracking Area Code (TAC) associated to the PLMN, and
a RAN Area Code (RANAC) associated to the PLMN.

6. A non-transitory computer-readable comprising, stored thereupon, a computer program comprising instructions configured so that, when executed by a processor, the instructions cause the processor to perform the method of claim 4.

7. A User Equipment (UE) configured for re-establishing a Radio Resource Control (RRC) connection to a target cell in a wireless communications network, the UE comprising:
memory; and
a processing circuit operatively coupled to the memory and configured, by way of program instructions stored in said memory, to:
when the target cell is found, generate a security token, wherein an input value in a security token generating function is adapted to comprise a set of input parameters, which set of input parameters is adapted to comprise at least a cell identifier of the target cell and an indication of a Public Land Mobile Network (PLMN) of the target cell, and
send a re-establishment request to a target network node serving the target cell, which re-establishment request is adapted to comprise the security token;
wherein the set of input parameters further comprises:
a Tracking Area Code (TAC) associated to the PLMN, or
a RAN Area Code (RANAC) associated to the PLMN.

8. The UE of claim 7, wherein any of the cell identifier and the indication of the PLMN of the target cell is represented by any one or more out of:
a PLMN identity,
a Cell identity,
a hash and/or checksum of broadcasted system information or parts thereof comprising the PLMN identity and Cell identity,
multiple PLMN identities and multiple Cell identities,
a Tracking Area Code (TAC) associated to the PLMN, and
a RAN Area Code (RANAC) associated to the PLMN.

9. A source network node configured for re-establishing a Radio Resource Control (RRC) connection of a User Equipment (UE) to a target cell in a wireless communications network, the source network node comprising:
memory; and
a processing circuit operatively coupled to the memory and configured, by way of program instructions stored in said memory, to:
receive from a target network node serving the target cell, a security token,
generate a security token, wherein an input value in a security token generating function is adapted to comprise a set of input parameters, which set of input parameters is adapted to comprise at least a cell identifier of the target cell and an indication of a Public Land Mobile Network (PLMN) of the target cell, and
if the received security token is successfully verified when compared with the generated security token, provide to the target network node a UE context related to the RRC connection of the UE, to enable the target network node to re-establish the RRC connection;
wherein the set of input parameters further comprises:
a Tracking Area Code (TAC) associated to the PLMN, or
a RAN Area Code (RANAC) associated to the PLMN.

10. The source network node of claim 9, wherein any of the cell identifier and the indication of the PLMN of the target cell is adapted to be represented by any one or more out of:
a PLMN identity,
a Cell identity,
a hash and/or checksum of broadcasted system information or parts thereof comprising the PLMN identity and Cell identity,
multiple PLMN identities and multiple Cell identities,
a Tracking Area Code (TAC) associated to the PLMN, and
a RAN Area Code (RANAC) associated to the PLMN.

* * * * *